United States Patent
Widener

(10) Patent No.: US 9,002,105 B2
(45) Date of Patent: Apr. 7, 2015

(54) AUTOMATED CONTOUR DETECTION METHODS, SYSTEMS AND PROCESSOR-READABLE MEDIA

(71) Applicant: Xerox Corporation, Norwalk, CT (US)

(72) Inventor: Michele Louise Widener, Los Angeles, CA (US)

(73) Assignee: Xerox Corporation, Norwalk, CT (US)

( * ) Notice: Subject to any disclaimer, the term of this patent is extended or adjusted under 35 U.S.C. 154(b) by 138 days.

(21) Appl. No.: 13/786,612

(22) Filed: Mar. 6, 2013

(65) Prior Publication Data

US 2014/0254925 A1    Sep. 11, 2014

(51) Int. Cl.
  *G06K 9/00* (2006.01)
  *G06K 9/34* (2006.01)
  *G06K 9/40* (2006.01)
  *G06K 9/46* (2006.01)

(52) U.S. Cl.
  CPC .................................. *G06K 9/4604* (2013.01)

(58) Field of Classification Search
  None
  See application file for complete search history.

(56) References Cited

U.S. PATENT DOCUMENTS

| | | | |
|---|---|---|---|
| 4,701,782 A | 10/1987 | Duvent | |
| 4,908,872 A | 3/1990 | Toriu et al. | |
| 6,366,684 B1 | 4/2002 | Gerard et al. | |
| 7,116,823 B2 | 10/2006 | Clark et al. | |
| 7,508,545 B2 | 3/2009 | Ng et al. | |
| 7,715,589 B2 | 5/2010 | Freeman et al. | |
| 2003/0025921 A1 | 2/2003 | Delean | |
| 2003/0099397 A1* | 5/2003 | Matsugu et al. | 382/173 |
| 2006/0072128 A1* | 4/2006 | Ng et al. | 358/1.9 |
| 2008/0024800 A1* | 1/2008 | Turner et al. | 358/1.8 |
| 2008/0123150 A1 | 5/2008 | Ono et al. | |
| 2009/0016582 A1* | 1/2009 | Penn et al. | 382/128 |
| 2009/0136108 A1 | 5/2009 | Badiei et al. | |
| 2009/0141997 A1* | 6/2009 | Lee et al. | 382/260 |
| 2010/0177946 A1 | 7/2010 | De Bruijne et al. | |
| 2011/0286671 A1* | 11/2011 | Xu | 382/199 |
| 2014/0078152 A1* | 3/2014 | Chang et al. | 345/441 |

* cited by examiner

*Primary Examiner* — Bernard Krasnic
(74) *Attorney, Agent, or Firm* — Kermit D. Lopez; Luis M. Ortiz; Ortiz & Lopez, PLLC

(57) ABSTRACT

A method and system for identifying existence and occurrence of a contour. The contour presence can be identified by taking a second derivative of a color space (e.g., $L^*$, $a^*$, and $b^*$) value of a rendered image derived utilizing an ICC profile that models behavior of a MFD as a smoothness metric. A moving average filter can be applied to minimize an extraneous peak and trough in the second derivative that can be contributed to noise. The contour can be detected if a filtered second derivative lies outside a given range. The location of the contour can be identified by matching up an input value with corresponding input value of the image. A probability of the contour being visible in a rendered output can be then determined by separately analyzing the color space values. The occurrence and location of contour can be displayed on a user interface to quickly and clearly identify the contour in the image without making physical prints and with minimal human interaction and expenditure.

15 Claims, 4 Drawing Sheets

AUTOMATED CONTOUR DETECTION METHODS, SYSTEMS AND PROCESSOR-READABLE MEDIA

TECHNICAL FIELD

Embodiments are generally related to rendering devices such as, printers, scanners, photocopy machines, and the like. Embodiments are additionally related to image-processing devices and techniques. Embodiments are also related to contour detection for use in rendering documents via rendering devices, such as, for example an MFD (Multi-Function Device).

BACKGROUND OF THE INVENTION

An MFD is a rendering device or office machine, which incorporates the functionality of multiple devices in a single apparatus or system, so as to offer a smaller footprint in a home or small business setting, or to provide centralized document management/distribution/production in the context of, for example, a large-office setting. A typical MFD provides a combination of some or all of the following capabilities: printer, scanner, photocopier, fax machine, e-mail capability, and so forth. Networked MFDs (Multi-Function Devices) can interact with an assemblage of varying rendering devices, client computers, servers, and other components that are connected to and communicate over a network.

Contours are visible, undesirable, sharp changes in the color of an image in an area that is otherwise characterized by a smooth, gradual, and consistent transition from one color to another. One of the most important aspects of color image quality is the identification and reduction of contours whenever possible. Conventional methods for contour identification require extensive rendering and human interaction to visually detect contours that may appear due to programming errors or MFD limitations. Such manual methods for contour identification are costly, time consuming and error prone.

Based on the foregoing, it is believed that a need exists for an improved method and system for identifying the existence and occurrence of contour, as will be described in greater detail herein.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for improved methods, systems and processor-readable media for managing a multi-function device (MFD), such as a printer, scanner, photocopy machine, fax machine, etc., or a combination thereof.

It is another aspect of the disclosed embodiments to provide for methods, systems and processor-readable media for identifying the existence and occurrence of contour.

It is further aspect of the disclosed embodiments to provide for methods, systems and processor-readable media for identifying a probability of contour visibility upon rendering.

The aforementioned aspects and other objectives and advantages can now be achieved as described herein. A method and system for identifying the existence and occurrence of a contour is disclosed herein. The contour presence can be identified by taking a second derivative of a color space (e.g., L*, a*, and b*) value of a rendered image derived utilizing an ICC profile that models behavior of a MFD as a smoothness metric. A moving average filter can be applied to minimize an extraneous peak and trough in the second derivative that can be contributed to noise. The contour can be detected if a filtered second derivative lies outside a given range. The location of the contour can be identified by matching up an input value (x value) with corresponding input value of the image. A probability of the contour being visible in a printed output can be then determined by separately analyzing the color space values. The occurrence and location of contour can be displayed on a user interface to quickly and clearly identify the contour in the image without making physical prints and with minimal human interaction and expenditure.

The color space values can be analyzed separately and if there is more than one extraneous filtered second derivative value within at least five input values, the probability of contour visibility upon rendering is high. If, after filtering, there is still a lone peak or trough in the second derivative probability of contour visibility upon rendering is average. If the limiting range of the second derivative is lowered then the probability of contour visibility is low. Such constraints can be set after carefully analyzing visual response data and comparing the data to a graph of the second derivative.

A sweep can be selected to analyze and a destination profile to render the image by a user on the user interface. The rendered image and a bar emanating from the highest probability contours at an appropriate input value can be displayed on the user interface in order to enable quick toggling between the destination profile and the sweep. The user can also select a detailed graph to display, including the original color space values, a first derivative, the second derivative, and the filtered second derivative for closer analysis. The system mathematically identifies inconsistencies within an image that occur as contours and minimize excessive rendering and time spent on contour detection.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The embodiments now will be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The disclosed embodiments are described in part below with reference to flowchart illustrations and/or block diagrams of methods, systems, computer program products and data structures according to embodiments of the invention. It will be understood that each block of the illustrations, and combinations of blocks, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 1:
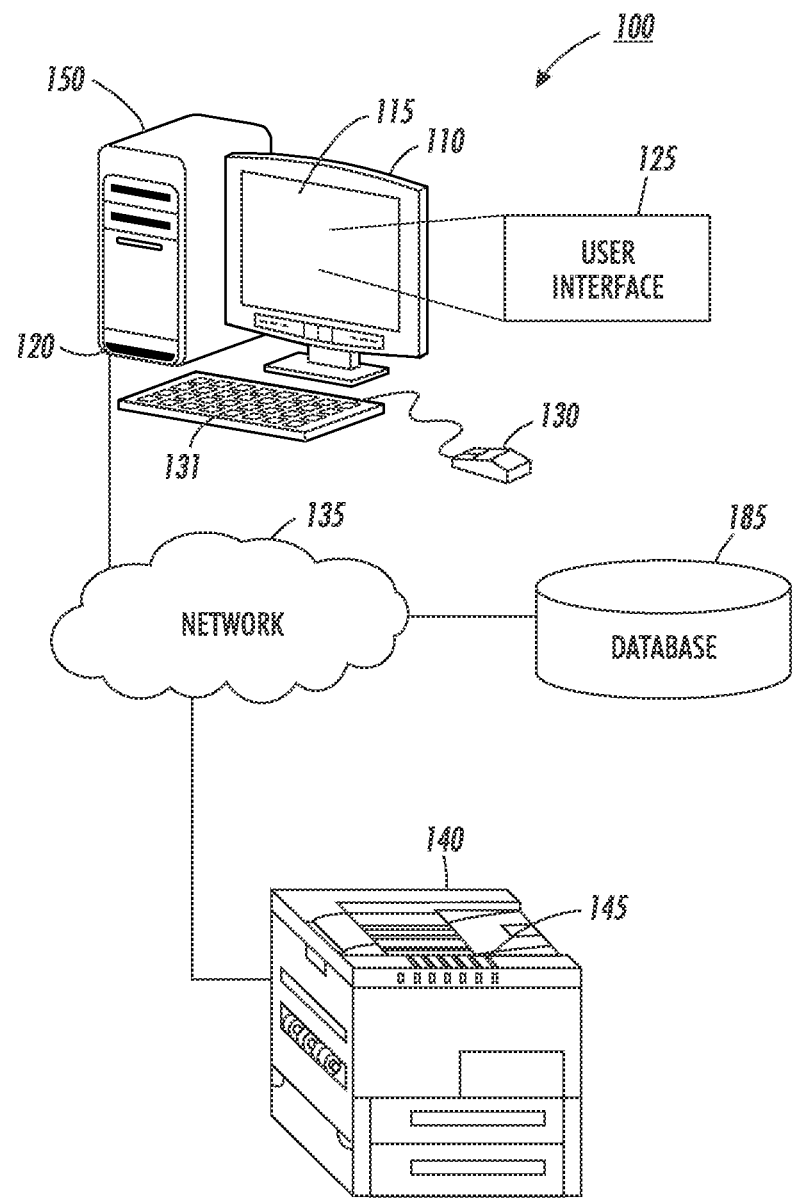
FIG. 1 illustrates an example of a multi-function device coupled to a data-processing apparatus through a network, in accordance with the disclosed embodiments.

Referring to FIG. 1, an example data-processing system 100 is shown, which can be configured to include one or more networked devices, such as networked device 140, coupled to a data-processing apparatus 110 through a network 135. One or more embodiments can be implemented in the context of, for example, data-processing system 100. In some embodiments, networked device 140 may be implemented as a rendering device such as a printer, scanner, copy machine, etc. In other embodiments, networked device 140 may be an MFD, a file server and/or a print server, depending upon design considerations. The data-processing apparatus 110 may be, for example, a personal computer or other computing device, and can includes central processor 120, a display device 115, a keyboard 131, and a pointing device 130 (e.g., mouse, track ball, pen device, or the like).

Note that as utilized herein, the term "networked device" may refer to an apparatus or system such as a printer, scanner, fax machine, copy machine, etc., and/or a combination thereof (e.g., an MFD). Preferably, networked device 140 is an MFD 140 capable of multiple rendering functions such as printing, copying, scanning, faxing, etc. In some embodiments, the MFD 140 may be implemented with a single rendering function. In other embodiments, the MFD 140 can be configured to provide multiple rendering functions, such as scanning, faxing, printing and copying. Electronic buttons 145 or a control panel containing such buttons can be disposed on the MFD 140 to control various operations of the MFD 140.

Figure 2:
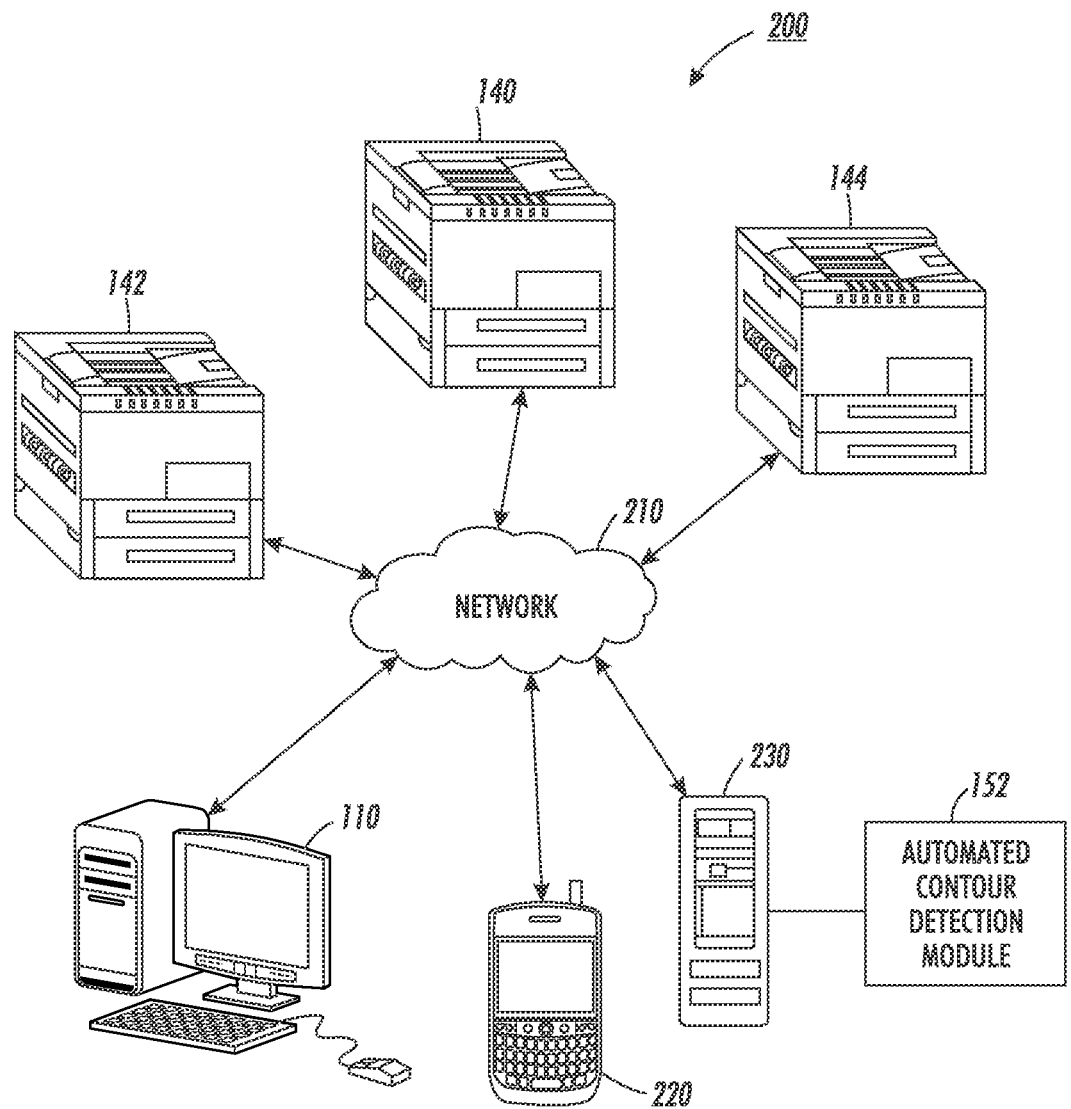
FIG. 2 illustrates a graphical representation of an image processing system having a contour identification module associated with a network, in accordance with the disclosed embodiments.

The data-processing apparatus 110 can be coupled to the MFD 140 (and other rendering devices) through a computer network 135 (which is analogous to the computer network 210 shown in FIG. 2). Network 135 (and similarly network 210) may employ any network topology, transmission medium, or network protocol. The network 135 or 210 may include connections, such as wire, wireless communication links, or fiber optic cables. In the depicted example, network 135 is the Internet representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. The network 135 can further communicate with a database 185.

The networked MFD 140 includes a user interface 145, such as a panel menu. The panel menu may be used to select features and enter other data in the device 140. Such interfaces may include, for example, touch screens having touch activated keys for navigating through an option menu or the like. A driver program, for example, can be installed on the data-processing apparatus 110 and can reside on the host device's hard drive 150. The driver program may be activated through an application interface so that a user may generate a rendering job with the driver for processing by the MFD 140.

The data-processing apparatus 110 may be, in some embodiments, a wireless devices, such as a laptop computer, pad computing device or even a Smartphone. For purposes of this example, however, it can be assumed that data-processing apparatus 110 is a desktop computer and/or a server. In the example shown in FIG. 1, data-processing apparatus 100 includes a GUI 125 for communicating rendering features for processing, for example, the rendering job to a user 325 and accepting the user's 325 selection of available rendering features. The user interface 125 displays information and receives data through device display and/or the keyboard/mouse combination. The interface 125, also serves to display results, whereupon the user 325 may supply additional inputs or terminate a given session. The data-processing apparatus 110 can be, for example, any computing device capable of being integrated within a network, such as a PDA, personal computer, cellular telephone, point-of-sale terminal, server, etc.

The input device of the networked device 140, for example, may be a local user interface 125, such as a touch-screen display or separate keypad and display or a memory fob or the like as discussed above. Alternatively or additionally, the input device may be a wireless port that receives a wireless signal containing constraint data from a portable device. The wireless signal may be an infrared or electromagnetic signal. A system administrator may input constraint data through the local user interface 125 by manipulating the touch screen, keypad, or communicating via wireless messages through the wireless port. The administrator's portable device that communicates wirelessly can be, for example, a personal digital assistant (PDA), wireless computing device, or the like, as noted above.

The following description is presented with respect to embodiments of the disclosed embodiments, which can be embodied in the context of the data-processing apparatus 110 and the networked device 140 depicted in FIG. 1. The disclosed embodiments, however, is not limited to any particular application or any particular environment. Instead, those skilled in the art will find that the system and methods of the disclosed embodiments may be advantageously applied to a variety of system and application software, including database management systems, word processors, and the like. Moreover, the present invention may be embodied on a variety of different platforms, including Macintosh, UNIX, LINUX, and the like. Therefore, the description of the exemplary embodiments, which follows, is for purposes of illustration and not considered a limitation.

FIG. 2 illustrates a graphical representation of an image processing system 200 having a contour detection module 152 associated with a network 210, in accordance with the disclosed embodiments. The image processing system 200 generally includes a network infrastructure 210 associated with one or more networked MFDs 140, 142 and 144, data-processing system 110, a mobile communication device 220 and a server 230. Data-processing apparatus 110 depicted in FIG. 1 can be, for example, a server 230. Other devices such as, for example, desktops, network devices, palmtops, mobile phones, etc may also be included in the network 210, as service providers. The MFDs 140, 142 and 144 can be located remotely with respect to each other, or alternatively, they may be located locally with respect to each other.

The typical MFD 140 may act as a combination of a printer, scanner, photocopier, fax and e-mail. While three MFDs 140, 142 and 144 are shown by way of example, it is to be appreciated that any number of MFDs may be linked to the network 210, such as, four, six or more rendering devices. In general, the MFDs 140, 142 and 144 can be employed to perform a rendering output function (e.g., printing, scanning, copying, faxing, etc.) within a networked environment. Note that MFDs 140, 142 and 144 are generally analogous to one another. The contour detection module 152 detects the existence and occurrence of a contour 375 in an image 365.

Note that as utilized herein, the term "module" may refer to a physical hardware component and/or to a software module. In the computer programming arts, such a software "module" may be implemented as a collection of routines and data structures that performs particular tasks or implements a particular abstract data type. Modules of this type are generally composed of two parts. First, a software module may list the constants, data types, variable, routines, and so forth that can be accessed by other modules or routines. Second, a software module may be configured as an implementation, which can be private (i.e., accessible only to the module), and which contains the source code that actually implements the routines or subroutines upon which the module is based.

Therefore, when referring to a "module" herein, the inventors are generally referring to such software modules or implementations thereof. The methodology described herein can be implemented as a series of such modules or as a single software module. Such modules can be utilized separately or together to form a program product that can be implemented through signal-bearing media, including transmission media and recordable media. The present invention is capable of being distributed as a program product in a variety of forms, which apply equally regardless of the particular type of signal-bearing media utilized to carry out the distribution.

Examples of signal-bearing media can include, for example, recordable-type media, such as floppy disks, hard disk drives, CD ROMs, CD-Rs, etc., and transmission media, such as digital and/or analog communication links. Examples of transmission media can also include devices such as modems, which permit information to be transmitted over standard telephone lines and/or the more advanced digital communications lines.

Figure 3:
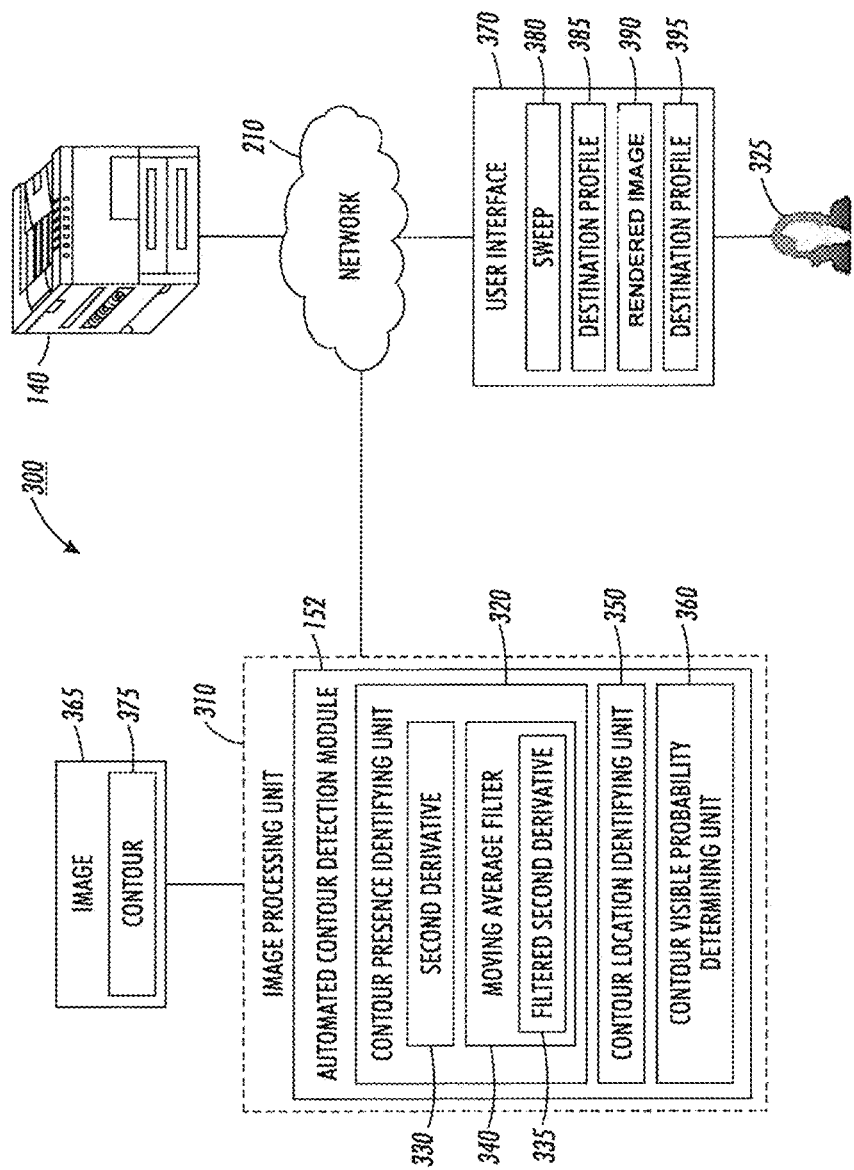
FIG. 3 illustrates a block diagram of a contour identification system, in accordance with a preferred embodiment.

FIG. 3 illustrates a block diagram of a contour identification system 300, in accordance with a preferred embodiment. Contours are salient coarse edges that belong to objects and region boundaries in an image. The contour identification system 300 generally includes an image processing unit 310 configures with the automated contour detection module 152. The image processing unit 310 is preferably a small, handheld computer device or palmtop computer as depicted in FIG. 1 that provides portability and is adapted for easy mounting. The contour detection module 152 can be configured to include a contour presence identifying unit 320, a contour location identifying unit 350 and a contour visible probability determining unit 360. The contour identification system 300 further includes a user interface 370 and the MFD 140 connected via the network 210.

Note that the network 210 may employ any network topology, transmission medium, or network protocol. The network 210 may include connections, such as wire, wireless communication links, or fiber optic cables. Network 210 can also be an Internet representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages.

The contour presence identifying unit 320 identifies presence of the contour 375 by taking a second derivative 330 of a color space (e.g., L*, a*, and b*) value of a rendered image 390 derived utilizing an ICC profile that models behavior of the MFD 140 as a smoothness metric. In color management, an ICC profile is a set of data that characterizes a color input or output device, or a color space, according to standards promulgated by the International Color Consortium (ICC). Profiles describe the color attributes of a particular device or viewing requirement by defining a mapping between the device source or target color space and a profile connection space (PCS). This PCS is either CIELAB (L*a*b*) or CIEXYZ. Mappings may be specified using tables, to which interpolation is applied, or through a series of parameters for transformations.

A Lab color space is a color-opponent space with dimension L for lightness and a and b for the color-opponent dimensions, based on nonlinearly compressed CIE XYZ color space coordinates. The CIE coordinates are based on a cube root transformation of the color data. For example, any color can be represented utilizing 3-dimensional L*, a*, and b* coordinates. In a gradual, uniform transition from one color to another, the line through Lab space connecting the two colors is a straight line. The following conversions can be performed on an RGB sweep 380 utilizing a modified version of an existing MatLab script as shown below:

RGB→L*,a*,b*

RGB→cmyk (using an ICC profile that models the measured output of the MFD)→L*, a*, b*

The system 300 measures consistency within an image 365 instead of the consistency between two images. The first derivative illustrates how rapidly the transition from one color to another occurs, but the second derivative 330 illustrates how smoothly that transition occurs. Theoretically, since the original L*, a*, and b* values are straight lines, the second derivative 330 is a constant line, y=0, where the x variable represents the input value and the y variable represents the second derivative 330.

The contour presence identifying unit 320 includes a moving average filter 340 to minimize extraneous peaks and troughs in the second derivative 330 that is contributed to noise. A filtered second derivative 335 possesses a limited range that if exceeded, indicates the visibility of contour 375. Through observation and comparison, it is experimentally determined that the limiting range is from −0.125 to 0.125. The contour location identifying unit 350 identifies the contour 375 by matching up the input value (x value) with the corresponding input value of the image 365.

The contour visible probability determining unit 360 determines probability of the contour 375 being visible in the rendered output 390 by separately analyzing the color space values. If there is more than one extraneous filtered second derivative value 335 within at least five input values, the probability of contour visibility upon rendering is high. If, after filtering, there is still a lone peak or trough in the second derivative 335 probability of contour visibility upon rendering is average. If the limiting range of the second derivative 335 is lowered then the probability of contour visibility is low. Otherwise, there is essentially no chance of seeing the contour 375 in the image 365. Such constraints can be set after carefully analyzing visual response data and comparing the data to a graph 395 of the second derivative 330.

The user interface 370 generally includes the sweep 380 that can be selected to analyze and a destination profile 385 to render the image 365 by the user 325. The user interface 370 further includes the rendered image 390 and a bar emanating from the highest probability contours at an appropriate input value in order to enable quick toggling between the destination profile 385 and the sweep 380. The user 325 can also select the detailed graph 395 to display, including the original color space values, a first derivative, the second derivative 330, and the filtered second derivative 335 for closer analysis. The occurrence and location of contour 375 can be displayed on the user interface 370 to quickly and clearly identify the contour 375 in the image 365 without making physical prints and with minimal human interaction and expenditure.

Figure 4:
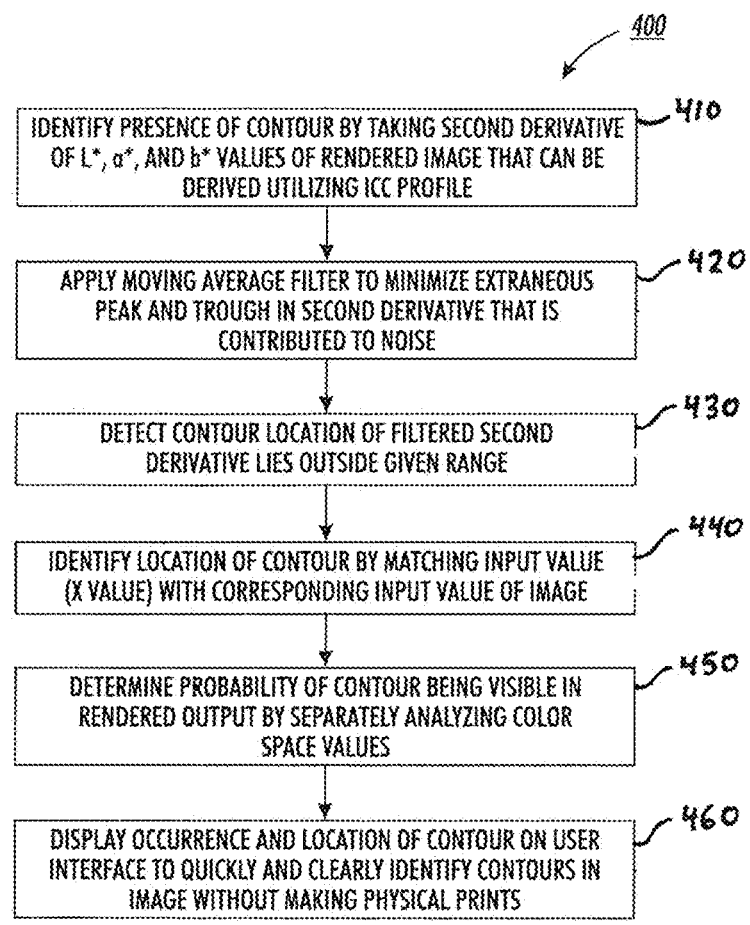
FIG. 4 illustrates a high level flow chart of operations illustrating logical operational steps of a method for identifying the existence and occurrence of contour, in accordance with an alternative embodiment.

FIG. 4 illustrates a high level flow chart of operations illustrating logical operational steps of a method 400 for identifying the existence and occurrence of contour 375, in accordance with an alternative embodiment. Note that in FIGS. 1-4, identical or similar blocks are generally indicated by identical reference numerals. The presence of the contour 375 can be identified by taking the second derivative 330 of L*, a*, and b* values of the rendered image 390 that can be derived utilizing the ICC profile that models behavior of the MFD 140 as a smoothness metric, as described at block 410.

The moving average filter 340 can be applied to minimize an extraneous peak and trough in the second derivative 330 that can be contributed to noise, as shown at block 420. The contour 375 can be detected at location where the metric lies outside a given range, as mentioned at block 430. The location of the contour 375 can be identified by matching up the input value (x value) with the corresponding input value of the image 365, as depicted at block 440. The probability of the contour 375 being visible in the printed output 390 can be then determined, as shown at block 450. The occurrence and location of contour 375 can be displayed on the user interface 370 to quickly and clearly identify the contour 375 in the image 365 without making physical prints and with minimal human interaction and expenditure, as indicated at block 460. The system 300 mathematically identifies inconsistencies within the image 365 that occur as contour 375 and minimize excessive rendering and time spent on contour detection.

Based on the foregoing, it can be appreciated that a number of embodiments, preferred and alternative, are disclosed herein. For example, in one embodiment, a method for identifying the existence and occurrence of contour 375, can be implemented. Such a method can include the steps or logical operations of, for example, identifying the occurrence of the contour 375 by taking a second derivative (e.g., see block 330 of FIG. 3) of a color space value associated with the image 365 derived via a color management profile that models the behavior of a multi-function device (e.g., MFD 140, MFD 142, MFD 144, etc) as a smoothness metric; identifying the location of the contour 375 by matching the input value to a corresponding input value of the image 365 to thereafter determine the probability of the contour 375 being visible in a rendered output thereof by separately analyzing the color space value; and presenting the occurrence and the location of the contour 375 to assist in quickly and clearly identifying the contour 375 in the image 365 without rendering a physical print thereof and with minimal human interaction and expenditure.

In another embodiment, the color space value can comprise L*, a*, and b* values. In yet another embodiment, steps or logical operations can be implemented for applying the moving average filter or module 320 to minimize extraneous peaks and troughs in the second derivative 330 that contributes to noise; and thereafter detecting the contour 375 if the filtered second derivative 335 lies outside a particular range of values.

In still another embodiment, the probability of the contour visibility upon rendering is high if the extraneous filtered second derivative value(s) 335 exists within at least five input values. In addition, or in another embodiment, the probability of the contour visibility upon rendering is average if after filtering the extraneous peak(s) and/or trough(s) exist in the second derivative 330. In addition, or in another embodiment, the probability of the contour visibility upon rendering is low if the particular range of values with respect to the second derivative 330 is low.

In still another embodiment, steps or logical operations can be implemented for selecting a sweep 380 to analyze and a destination profile 395 to render the image 365; displaying the rendered image and a graphical bar emanating from a highest probability contour at an appropriate input value in order to enable quick toggling between the destination profile 395 and the sweep 380. In other embodiments, steps or logical operations can be implemented for selecting a detailed graph to display including the original color space value, a first derivative, the second derivative 330, and the filtered second derivative 335 for closer analysis; and designating a constraint after analyzing a visual response data and comparing the data to a graph of the second derivative 330.

In another embodiment, a system can be implemented for identifying an existence and an occurrence of a contour. Such system can include, for example, processor (e.g., processor 120), a data bus coupled to the processor (computer 110, hard disk drive 150, etc., internally include data base); and a computer-usable medium (e.g., image processing unit 310 constitutes a computer-usable medium) embodying computer program code, the computer-usable medium being coupled to the data bus. The computer program code can include, for example, instructions executable by the processor and configured for: identifying an occurrence of a contour by taking a second derivative of a color space value associated with an image derived via a color management profile that models a behavior of a multi-function device as a smoothness metric; identifying a location of the contour by matching an input value to a corresponding input value of the image to thereafter determine a probability of the contour being visible in a rendered output thereof by separately analyzing the color space value; and presenting the occurrence and the location of the contour to assist in quickly and clearly identifying the contour in the image without rendering a physical print thereof and with minimal human interaction and expenditure.

In still another embodiment, a processor-readable medium (e.g., data-processing system 100, hard disk drive 150, etc) storing computer code representing instructions to cause a process for identifying an existence and an occurrence of a contour, can be implemented. Such computer code can be configured to include code to, for example, identify an occurrence of a contour by taking a second derivative of a color space value associated with an image derived via a color management profile that models a behavior of a multi-function device as a smoothness metric; identify a location of the contour by matching an input value to a corresponding input value of the image to thereafter determine a probability of the contour being visible in a rendered output thereof by separately analyzing the color space value; and present the occurrence and the location of the contour to assist in quickly and clearly identifying the contour in the image without rendering a physical print thereof and with minimal human interaction and expenditure.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for identifying an existence and an occurrence of a contour, said method comprising:
    identifying an occurrence of a contour by taking a second derivative of a color space value associated with an image derived via a color management profile that models a behavior of a multi-function device as a smoothness metric;
    identifying a location of said contour by matching an input value to a corresponding input value of said image to thereafter determine a probability of said contour being visible in a rendered output thereof by separately analyzing said color space value;
    presenting said occurrence and said location of said contour to assist in quickly and clearly identifying said contour in said image without rendering a physical print thereof and with minimal human interaction and expenditure;
    selecting a sweep to analyze and a destination profile to render said image; and
    displaying said rendered image and a graphical bar emanating from a highest probability contour at an appropriate input value in order to enable quick to toggling between said destination profile and said sweep.

2. The method of claim 1 wherein said color space value comprises L*, a*, and b* values.

3. The method of claim 1 further comprising:
    applying a moving average filter to minimize an extraneous peak and a trough in said second derivative that contributes to noise; and
    thereafter detecting said contour if a filtered second derivative lies outside a particular range of values.

4. The method of claim 3 wherein said probability of said contour visibility upon rendering is high if at least one extraneous filtered second derivative value exists within at least five input values.

5. The method of claim 3 wherein said probability of said contour visibility upon rendering is average if after filtering said extraneous peak and/or said trough exists in said second derivative.

6. The method of claim 3 wherein said probability of said contour visibility upon rendering is low if said particular range of values with respect to said second derivative is low.

7. The method of claim 1 further comprising:
    selecting a detailed graph to display including an original color space value, a first derivative, said second derivative, and a filtered second derivative for closer analysis; and
    designating a constraint after analyzing a visual response data and comparing said visual response data to a graph of said second derivative.

8. A system for identifying an existence and an occurrence of a contour, said system comprising:
    a processor;
    a data bus coupled to said processor; and
    a computer-usable medium embodying computer program code, said computer-usable medium being coupled to said data bus, said computer program code comprising instructions executable by said processor and configured for:
    identifying an occurrence of a contour by taking a second derivative of a color space value associated with an image derived via a color management profile that models a behavior of a multi-function device as a smoothness metric;
    identifying a location of said contour by matching an input value to a corresponding input value of said image to thereafter determine a probability of said contour being visible in a rendered output thereof by separately analyzing said color space value;
    presenting said occurrence and said location of said contour to assist in quickly and clearly identifying said contour in said image without rendering a physical print thereof and with minimal human interaction and expenditure;
    applying a moving average filter to minimize an extraneous peak and a trough in said second derivative that contributes to noise; and
    thereafter detecting said contour if a filtered second derivative lies outside a particular range of values, wherein said probability of said contour visibility upon rendering is high if at least one extraneous filtered second derivative value exists within at least five input values.

9. The system of claim 8 wherein said color space value comprises L*, a*, and b* values.

10. The system of claim 8 wherein said probability of said contour visibility upon rendering is average if after filtering said extraneous peak and/or said trough exists in said second derivative.

11. The system of claim 8 wherein said probability of said contour visibility upon rendering is low if said particular range of values with respect to said second derivative is low.

12. The system of claim 8 wherein said instructions are further configured for:
    selecting a sweep to analyze and a destination profile to render said image;
    displaying said rendered image and a graphical bar emanating from a highest probability contour at an appropriate input value in order to enable quick toggling between said destination profile and said sweep.

13. The system of claim 12 wherein said instructions are further configured for:

selecting a detailed graph to display including an original color space value, a first derivative, said second derivative, and a filtered second derivative for closer analysis; and designating a constraint after analyzing a visual response data and comparing said visual response data to a graph of said second derivative.

14. A processor-readable non-transitory medium storing computer code representing instructions to cause a process for identifying an existence and an occurrence of a contour, said computer code comprising code to:

identify an occurrence of a contour by taking a second derivative of a color space value associated with an image derived via a color management profile that models a behavior of a multi-function device as a smoothness metric;

identify a location of said contour by matching an input value to a corresponding input value of said image to thereafter determine a probability of said contour being visible in a rendered output thereof by separately analyzing said color space value;

present said occurrence and said location of said contour to assist in quickly and clearly identifying said contour in said image without rendering a physical print thereof and with minimal human interaction and expenditure;

apply a moving average filter to minimize an extraneous peak and a trough in said second derivative that contributes to noise; and thereafter detect said contour if a filtered second derivative lies outside a particular range of values, wherein said probability of said contour visibility upon rendering is high if at least one extraneous filtered second derivative value exists within at least five input values, said probability of said contour visibility upon rendering is average if after filtering said extraneous peak and/or said trough exists in said second derivative, and said probability of said contour visibility upon rendering is low if said particular range of values with respect to said second derivative is low.

15. The processor-readable non-transitory medium of claim 14 wherein said color space value comprises L*, a*, and b* values.

* * * * *